(12) United States Patent
Mallinger et al.

(10) Patent No.: US 8,657,334 B2
(45) Date of Patent: Feb. 25, 2014

(54) AIRBAG CUSHION

(75) Inventors: Heather Mallinger, Washington, MI (US); Mary Raska, Romeo, MI (US); Lyle Curry, White Lake, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 24 days.

(21) Appl. No.: 13/370,147

(22) Filed: Feb. 9, 2012

(65) Prior Publication Data

US 2012/0205900 A1 Aug. 16, 2012

Related U.S. Application Data

(60) Provisional application No. 61/441,683, filed on Feb. 11, 2011.

(51) Int. Cl.
*B60R 21/16* (2006.01)

(52) U.S. Cl.
USPC ..................... 280/743.1; 280/743.2

(58) Field of Classification Search
USPC ........................... 280/743.1, 743.2
See application file for complete search history.

(56) References Cited

U.S. PATENT DOCUMENTS

| | | | |
|---|---|---|---|
| 3,879,057 A | 4/1975 | Takayoshi | |
| 5,213,361 A | 5/1993 | Takeshi | |
| 5,997,037 A | 12/1999 | Hill | |
| 6,361,072 B1 | 3/2002 | Barnes | |
| 6,536,800 B2 | 3/2003 | Kumagai | |
| 6,616,184 B2 | 9/2003 | Fischer | |
| 6,969,086 B2 | 11/2005 | Hasebe | |
| 7,093,853 B2 | 8/2006 | Hasebe | |
| 7,131,664 B1 | 11/2006 | Hyunsok | |
| 7,137,647 B2 | 11/2006 | Adomeit | |
| 7,152,880 B1 | 12/2006 | Hyunsok | |
| 7,261,319 B2 | 8/2007 | Depottey | |
| 7,350,807 B2 | 4/2008 | Schneider | |
| 7,452,002 B2 | 11/2008 | Baumbach | |
| 7,484,757 B2 | 2/2009 | Thomas | |
| 7,607,683 B2 | 10/2009 | Fischer | |
| 7,665,761 B1 | 2/2010 | Green | |
| 7,695,012 B2 | 4/2010 | Libby | |
| 7,988,444 B2 * | 8/2011 | Amano et al. | 425/471 |
| 7,992,897 B2 * | 8/2011 | Sekino et al. | 280/739 |
| 8,070,183 B2 * | 12/2011 | Kumagai et al. | 280/743.2 |
| 8,196,957 B2 * | 6/2012 | Kubo et al. | 280/743.2 |
| 8,371,612 B2 * | 2/2013 | Williams | 280/743.2 |
| 2003/0218325 A1 | 11/2003 | Masahiro | |
| 2004/0232681 A1 | 11/2004 | Adomeit | |
| 2005/0110249 A1 | 5/2005 | Masahiro | |
| 2005/0161918 A1 | 7/2005 | Kazuaki | |
| 2005/0212275 A1 | 9/2005 | Masahiro | |
| 2006/0028009 A1 | 2/2006 | Masahiro | |

(Continued)

FOREIGN PATENT DOCUMENTS

| | | |
|---|---|---|
| DE | 20218732 | 3/2003 |
| EP | 1364838 | 5/2003 |

(Continued)

*Primary Examiner* — Toan To (74) *Attorney, Agent, or Firm* — Markell Seitzman (57) ABSTRACT

An airbag cushion (100) with a recessed portion formed on an exterior of the airbag cushion has a pair of side panels (104a, 104b) and a tether (180) for limiting outward movement of the inflated airbag cushion; and wherein the tether (180) forms a portion of the exterior surface of the airbag cushion (100).

18 Claims, 6 Drawing Sheets

(56) References Cited

U.S. PATENT DOCUMENTS

| | | |
|---|---|---|
| 2006/0043707 A1 | 3/2006 | Masahiro |
| 2006/0066089 A1 | 3/2006 | Masahiro |
| 2006/0082114 A1 | 4/2006 | Heym |
| 2006/0138761 A1 | 6/2006 | Masayoshi |
| 2006/0186656 A1 | 8/2006 | Masayoshi |
| 2006/0220364 A1 | 10/2006 | Klinkenberger |
| 2007/0108753 A1 | 5/2007 | Hyunsok |
| 2009/0033081 A1* | 2/2009 | Flischer et al. ............ 280/743.2 |
| 2010/0102542 A1* | 4/2010 | Nakajima et al. .......... 280/743.2 |

FOREIGN PATENT DOCUMENTS

| | | |
|---|---|---|
| EP | 1580083 | 3/2005 |
| GB | 2262919 | 12/1992 |
| JP | 10071911 | 3/1998 |
| JP | 11005505 | 1/1999 |
| JP | 11321506 | 11/1999 |
| JP | 2001233157 | 8/2001 |
| JP | 2005162195 | 6/2005 |
| JP | 2005280470 | 10/2005 |

* cited by examiner

AIRBAG CUSHION

RELATED APPLICATIONS

The present invention claims priority to provisional U.S. application 61/441,683 filed Feb. 11, 2011 entitled "Airbag cushion".

TECHNICAL FIELD

The present invention relates to an improved airbag cushion having a recessed or groove portion preferably for the passenger side of vehicles.

BACKGROUND OF THE INVENTION

Figure 1:
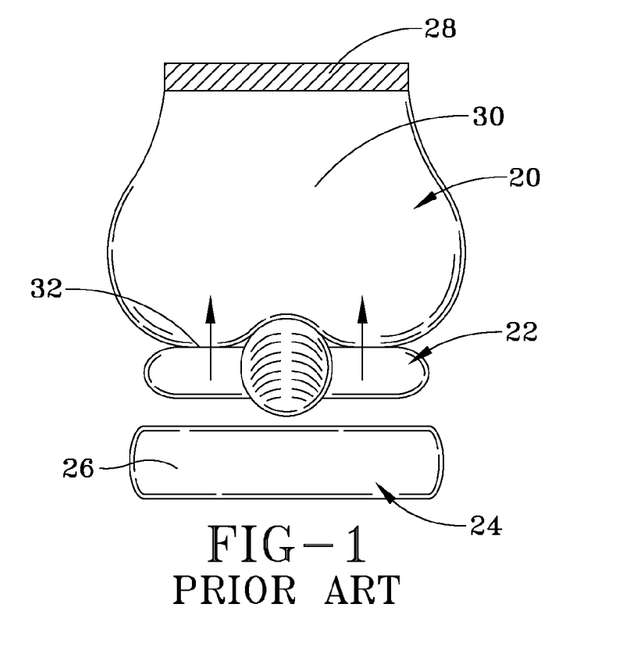
FIG. 1 illustrates a top view of one type of prior art passenger airbag cushion.

FIG. 1 illustrates a top view showing a deployed conventional prior art passenger side airbag 20 in relation to an occupant 22 seated on a seat 24. The seat back 26 is the only portion of the seat shown. Airbag 20 is inflated by an airbag inflator 28. Airbag 20 typically comprises a single inflatable chamber 30 inflated by gas from inflator 28. The face portion or panel 32 of the airbag impacts the occupant's chest, shoulders and head. As can be appreciated, as the occupant's seated position at the time of airbag inflation deviates from the normal seated position by taking a position closer to the vehicle's instrument panel, the velocity at which the airbag impacts the occupant increases. As can be appreciated, if the occupant's body is on or near the cover of the airbag module at the time of inflation, the airbag/occupant interaction is elevated.

Figure 2:
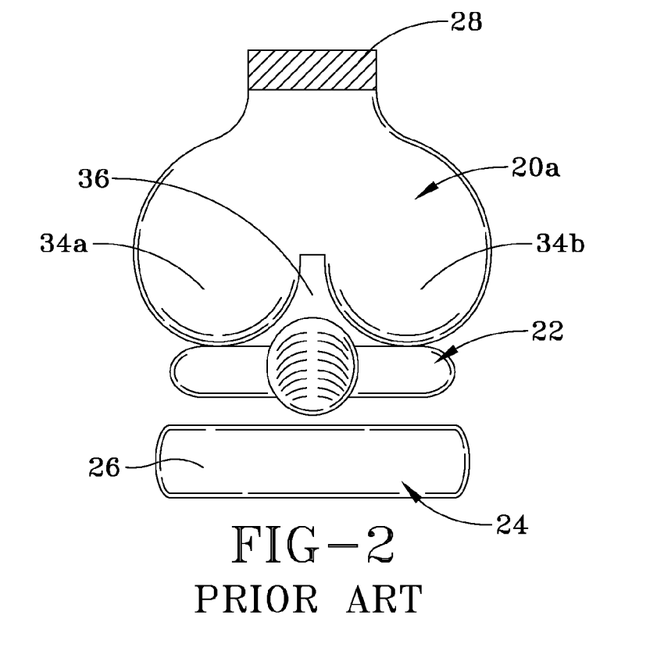
FIG. 2 is a top view showing the mode of operation of a prior art airbag cushion with a conventional recessed center portion.

It had been proposed that an airbag, such as 20a, be formed with spaced-apart lobes 34a and 34b, separated by a groove or space 36. When this prior art airbag 20a is inflated, it will take the shape as shown in FIG. 2 in which the space or groove 36 is positioned in front of the normally seated occupant, thereby avoiding contact with the occupant's head. The airbag-occupant loading is primarily between the lateral lobes 34a and 34b in relation to the right and left sides of the occupant's torso and the right and left shoulders of the occupant, and impact is lessened if the occupant is out of position at the beginning of airbag inflation.

In prior art U.S. Pat. No. 7,152,880, a grooved airbag cushion was proposed that had a main or central panel and a pair of side panels wherein the central panel had a face panel portion with an opening wherein the opening had edges to which a combination of additional pieces of airbag cushion material formed a recess.

Later in U.S. Pat. No. 7,131,664, this same concept was used to create an airbag cushion with a strategically placed recess at or below the gas inlet passage of the airbag cushion. In this patent, again the recess was formed with several pieces of airbag cushion material and the movement was limited by a separate internal tether.

As can be appreciated, the use of many small pieces of material used to form the grooved or recessed portions of the airbag cushion added to the time and complexity of the design.

The present invention greatly simplifies the manufacture of airbag cushion or airbag cushions with grooves or recesses by eliminating several fabric components.

The present invention provides a simpler and faster way to manufacture these airbag cushions while not sacrificing any performance criteria of the inflated airbag cushion.

The invention as described below can be used in any airbag cushion requiring a groove or recess regardless of where the groove or recess is located on the airbag cushion assembly.

SUMMARY OF THE INVENTION

An airbag cushion with a recessed portion formed on an exterior of the airbag cushion has a pair of side panels and a tether for limiting outward movement of the inflated airbag cushion; and wherein the tether forms a portion of the exterior surface of the airbag cushion. The preferred embodiment airbag cushion further has a central panel interposed between the pair of side panels and attached along edges of each side panel defining a single inflatable chamber with a gas inlet passageway. This central panel has a cut out; and the tether for limiting outward movement of the inflated airbag cushion, has one end of the tether attached to the central panel proximate the cut out and the opposite end of the tether secured to the central panel proximate the gas inlet passage. The pair of side panels, the central panel, and portions of the tether form the exterior surface of the airbag cushion. The side panels have a curved outer periphery. The tether has a main tether panel portion for limiting the outward movement of the cushion The main tether panel portion has an outer groove forming portion, the groove forming portion being part of the exterior surface of the airbag cushion. The tether also has a groove panel sewn or otherwise attached to the main tether panel portion, the groove panel being similarly sized and shaped to the outer groove portion of the main tether panel portion and being part of the exterior surface of the airbag cushion, the tether having a "y" shape when viewed in a cross section.

The groove portion of the main tether panel portion and the groove panel are sewn along edges of the cut out in the central panel, the groove portion being sewn one edge of the cut out and the groove panel to an opposite edge of the cut out. The main tether panel portion is sewn at an anchoring location inside the airbag cushion at or near the gas inlet passageway on a bottom or top portion of the central panel, where upon inflation the main tether panel portion has a twist formed between the anchoring location at or near the inlet and the groove panel portions, wherein the recessed portion is vertically oriented when the airbag cushion is deployed and inflated.

The main tether panel portion has a generally truncated triangular shape, the widest part extending from the groove portion to a narrow terminal end, the distance between the narrow terminal end to the widest part limits the distance the airbag cushion can open. The location wherein the groove panel is sewn or otherwise attached to the main tether panel portion of the tether defines the maximum depth of the recess formed in the airbag cushion.

BRIEF DESCRIPTION OF THE DRAWINGS

The invention will be described by way of example and with reference to the accompanying drawings in which.

DETAILED DESCRIPTION OF THE INVENTION

Airbag cushion 100 shown in FIGS. 3, 3a, 3b, 3c, 4, 4a, 4b and 5 includes a center panel 102 having a face panel portion 103, which faces the occupant to be protected, and a plurality of side panels 104a and 104b. Each of the above panels is made typically from woven airbag material comprising nylon or polyester. Each of the side panels 104a and 104b is substantially identical and the mirror image of the other. Each of the side panels 104a and 104b includes a neck portion 120 and a main portion 122. Each side panel 104a, 104b may optionally include a vent hole 119. The center panel 102 also includes a plurality of opposing neck portions 124 and a main portion 126; the face panel portion 103 mentioned above is part of the main portion 126. The main portion 126, in the vicinity of the face panel portion 103 includes a cut out or opening 130, which as seen below is used to form a recess in the inflated airbag 100. The airbag is formed by sewing edge 132a of side panel 104a to edge 134a of face panel portion 103. Similarly edge 132b is sewn to edge 134b in a known manner providing an airbag cushion 100 defining a single inflatable chamber with a gas inlet passageway with its general shape. Upon attachment of the various panels an inflator 308 is positioned within the neck of the airbag. Prior to inflation the airbag is folded and with the inflator 308 stored in a housing 306 of an airbag cushion module 300 of which airbag cushion 100 is a part. The inflator 308 in the housing 306 inflates the airbag cushion 100.

Figure 6:
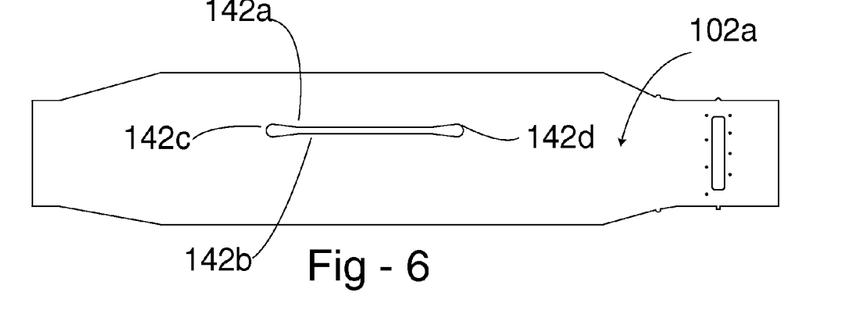
FIG. 6 is a plan view of an alternative opening with oblong shaped ends for the center panel.

Opening 130 includes two or more edges 140a, 140b, 140c and 140d. Even though opening 130 is shown as rectangular in shape, the opening 130 can also be oblong. FIG. 6 shows an alternate center panel 102a with an oval opening 130a having edges 142a and 142b with oblong rounded ends 142c and 142d. The opening 130, 130a can alternatively have an oval shape with pointed ends or any desired cutout slot or opening dependent on the desired shape of the recess groove needed for an inflated airbag. The groove can alternatively be oriented on a slant or horizontally as opposed to vertical, if so desired as the requirements for inflation protection dictate.

Figures 3, 3A, 3B, 3C:
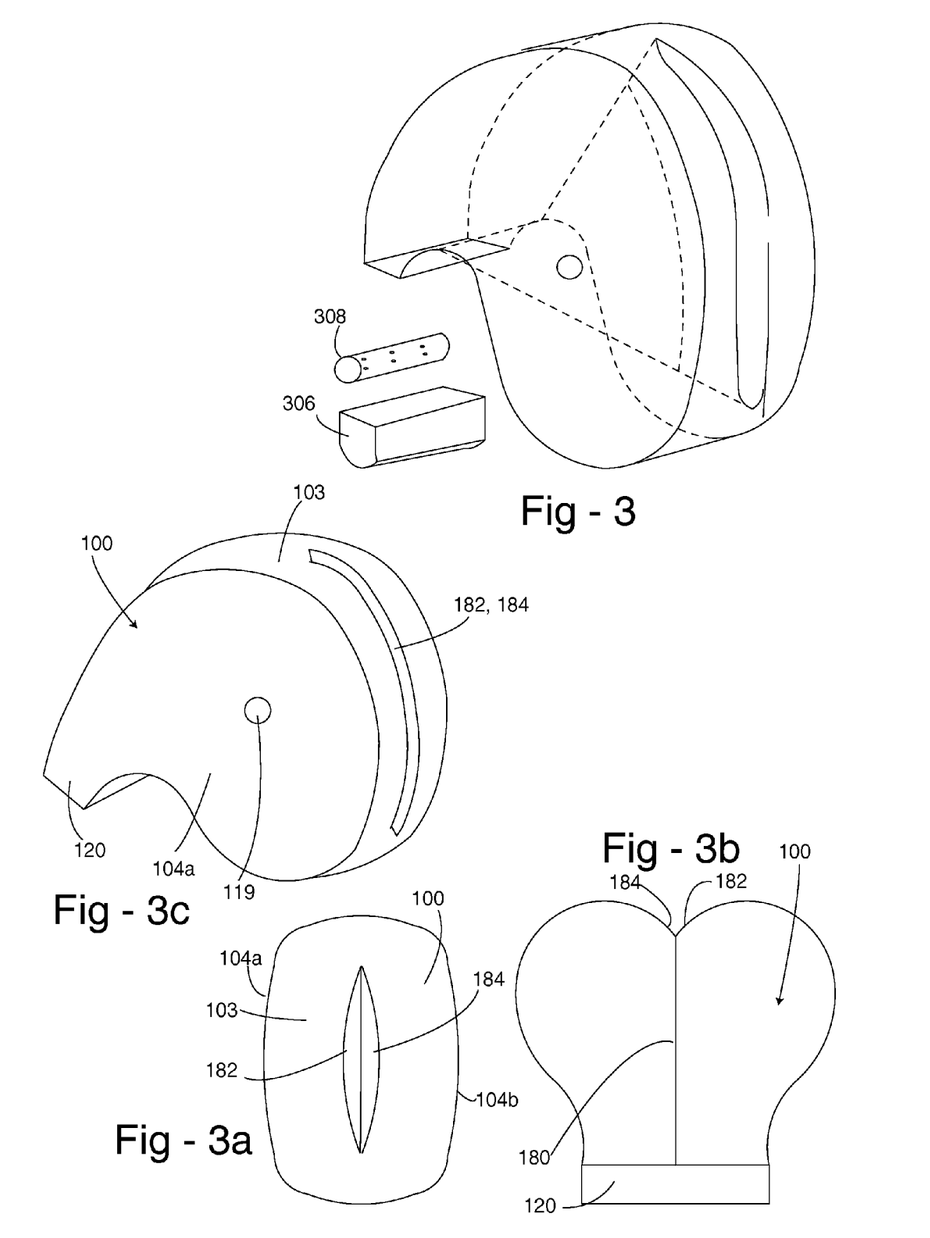
FIG. 3 is a diagrammatic view of an inflated airbag cushion with an airbag cushion housing and inflator incorporating the present invention.
FIG. 3a is a front view of the inflated airbag of FIG. 3.
FIG. 3b is a top view of the inflated airbag of FIG. 3.
FIG. 3c is a perspective view of the inflated airbag taken from FIG. 3.
Figure 4:
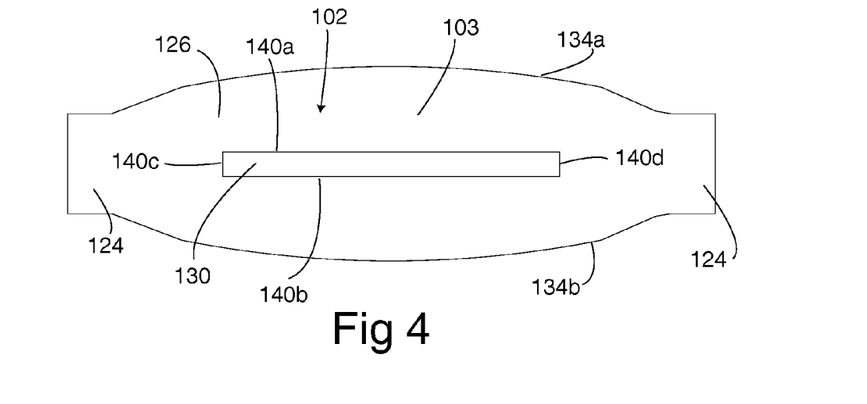
FIG. 4 is a plan view illustrating the central panel of airbag material shown in FIG. 3.
Figures 4A, 4B:
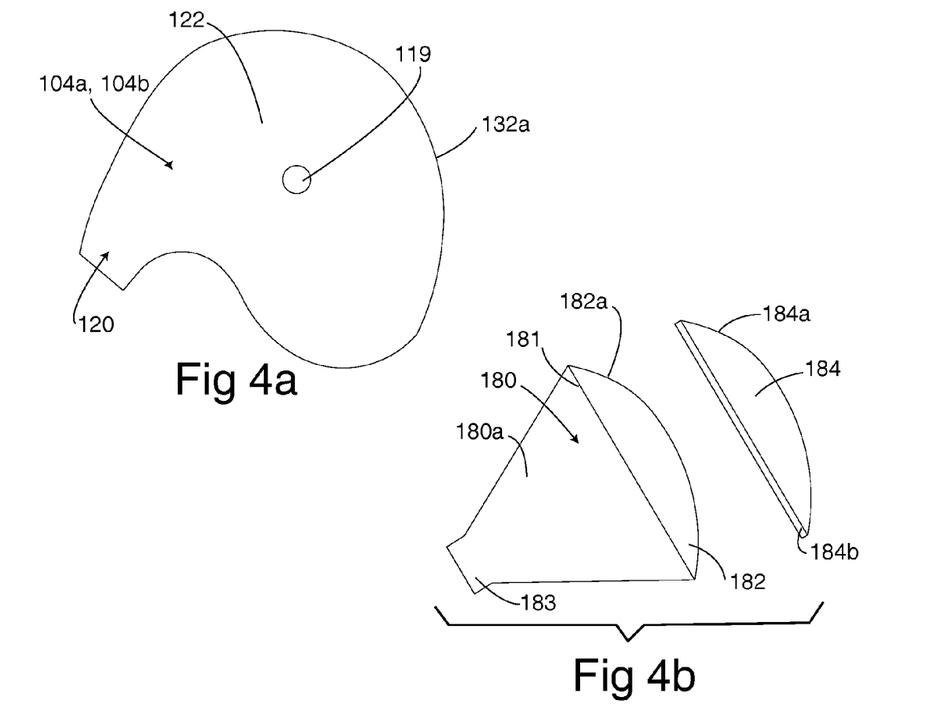
FIG. 4a is a plan view illustrating the side panel.
FIG. 4b is a plan view illustrating the tether with a main tether portion and a groove portion.
Figure 5:
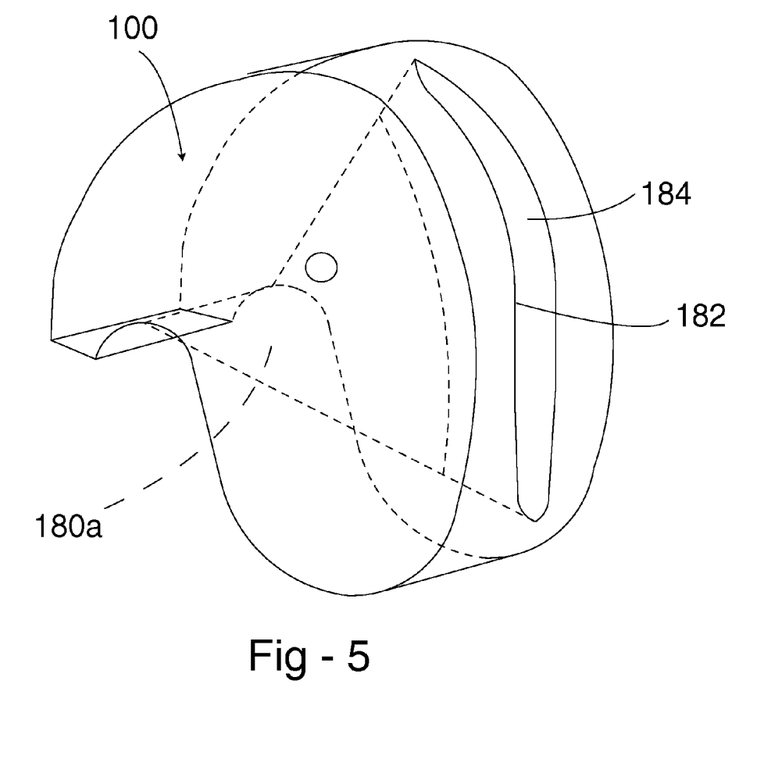
FIG. 5 is a perspective view of the deployed airbag in FIG. 3.

As further illustrated in FIG. 4a, in addition to the two side panels 104a and 104b, and the center panel 102 is a main tether panel portion 180a. This main tether panel portion 180a has a generally truncated triangular shape extending from a groove portion 182. The groove portion 182 has a curved outer edge 182a. Inward of the groove portion 182 is the widest part 181 of the main tether panel portion 180a. Extending inwardly, the main tether panel portion 180a narrows to a narrow terminal end 183. At the narrow terminal end 183 the main tether panel portion 180a is sewn to the central panel 102 near the neck portion 124 at or near either the top or bottom of the gas inlet passageway, as shown in FIGS. 3 and 5. This anchoring location of the main tether panel portion 180 is sewn to the bottom of the center panel 102.

Figure 7:
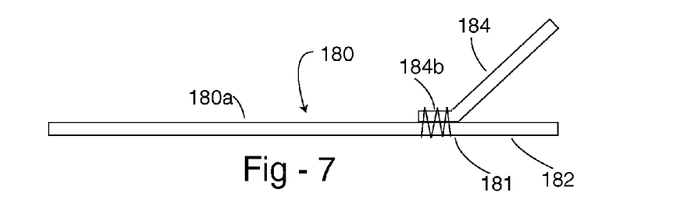
FIG. 7 is a cross sectional view of the tether made according to the present invention.

At the outer groove panel portion 182 adjacent the widest part 181 of the main tether panel portion 180a a second groove panel 184 is sewn at edge 184b. This forms a generally branched or "y" shape tether 180 when viewed as shown in FIG. 7. The outer groove portion 182 is sewn along edge 182a to one or two edges 140a, 140b, 140c, 140d of the cut out 130 depending on the cut out shape. The groove panel 184 is similarly sewn along edge 184a to one or more opposing edges 140a, 140b, 140c or 140d. As illustrated, portion 182 at edge 182a is sewn to edges 140a and 140c while groove panel 184 at edge 184a is sewn to edges 140b and 140d. When the airbag cushion 100 is sewn together as an assembly, the groove panel portion 182 of the main tether panel portion 180a and groove panel 184 both are open to and form part of the exterior surface of the airbag cushion.

Figure 7A:
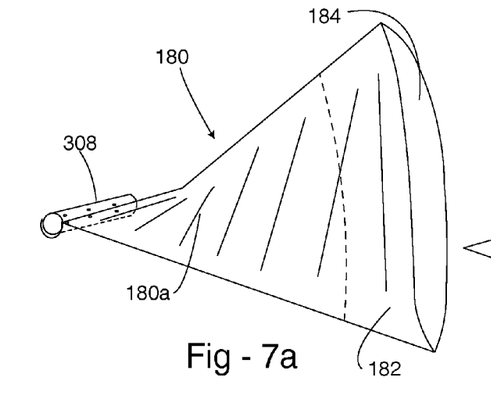
FIG. 7a shows an alternative way of anchoring the tether to an inflator.
Figure 7B:
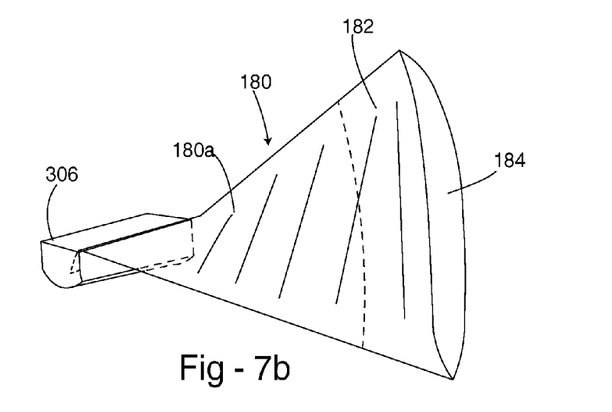
FIG. 7b shows an alternative way of anchoring the tether to an airbag cushion housing.
Figure 8:
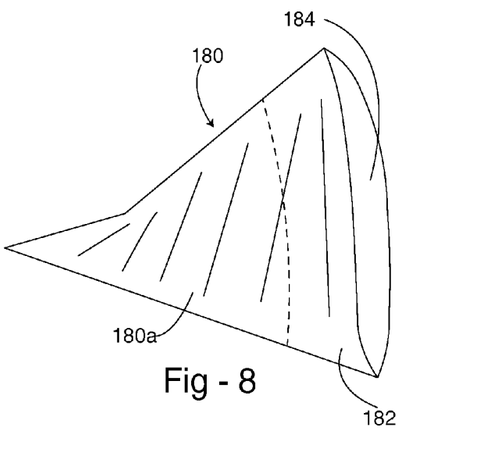
FIG. 8 is a perspective view of the tether showing a twist orientation.

This construction of a tether 180 as described enables the tether panel portion 180a as well as the groove panel 184 of the "y" shape tether 180 to be used as part of the exterior of the airbag cushion. The outer portions of the "y" shaped tether provide the exterior surfaces of the recessed part or groove in the airbag cushion assembly 100. This eliminates several parts required to make such an airbag cushion. The main tether panel portion 180a being anchored at a location near the gas inlet passageway limits the distance the airbag cushion 100 can move forward and also is part of the groove or recessed external surface of the airbag cushion 100. This shape of the main tether panel portion 180a insures both superior strength and fewer sewn seams. By sewing the tether 180 to the center panel, the fabrication is simplified when making a vertical groove or recess relative to a sitting passenger, when sewn the main tether portion has a twist which is showing in FIG. 8 formed between the anchoring location at or near the inlet and the groove panel portions. Alternatively, the main tether portion 180a can be secured by anchoring to the inflator 308, as shown in FIG. 7a or the airbag cushion housing 306, as shown in FIG. 7b or at any fixed location near the neck of the airbag cushion to limit the distance the airbag cushion 100 can deploy. It is preferred to sew the tether 180 to the center panel 102 as shown for ease of assembly and fabricating, however, these alternative anchorings of tether 180 are contemplated to be within the scope of the present invention.

The illustrated airbag cushion 100 as shown is the preferred embodiment. It is understood the use of a center panel 102 while preferred can be eliminated by or substituted simply modifying to shape the two side panel portions 104a and 104b.

Figure 9:
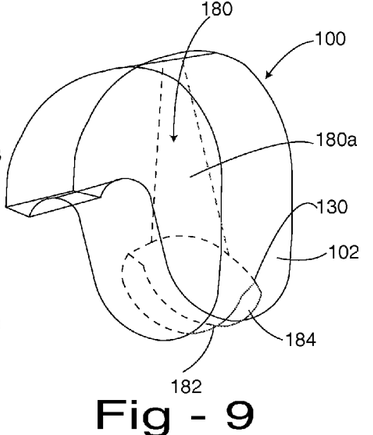
FIG. 9 is a perspective view of an alternative airbag cushion showing a tether made according to the present invention anchored to or affixed to a portion of the airbag cushion at one end and extending across the airbag cushion to a groove or slot forming end of the tether on an opposite side of the airbag cushion.

With reference to FIG. 9, the airbag cushion 100 is shown wherein the tether 180 extends from a surface of the airbag cushion 100 not near or adjacent the gas inlet passage to a frontal face panel portion 103 of the central panel 102 as previously discussed, but rather the main tether portion 180a is sewn to a panel of the airbag cushion 100 removed from the inlet passage and extending to a slot or opening 130 to form the recessed groove at the groove portion 182 and the second groove panel 184. As shown, the anchoring of the tether 180 is shown sewn or otherwise affixed to a top or upper surface in the central panel 102 and extending toward the bottom or lower portion of the central panel 102. As shown, this groove portion at the slot opening 130 formed by groove panel 182 and second groove panel 184 is smaller in length than previously shown groove of FIG. 3c. The depth or the length of the recess or groove formed in the airbag cushion 100 can be virtually any size as needed for a particular application or performance requirement. The tether 180 can be designed to form virtually any size groove by varying the size of the groove panel 182 and second groove panel 184 and the length of the slot or opening 130.

Figure 10:
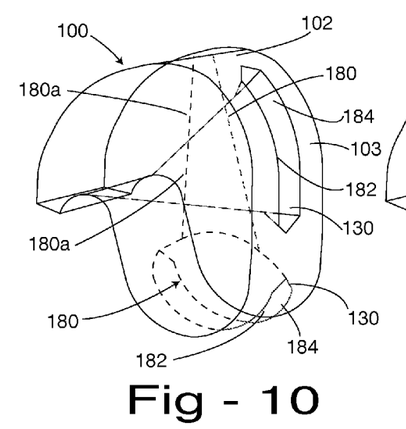
FIG. 10 is a perspective view of another alternative embodiment of the invention showing the use of two tethers in an airbag cushion construction similar to that shown in FIG. 5 combined with the airbag cushion of FIG. 9.

With reference to FIG. 10, another construction of the airbag cushion 100 is shown employing two tethers 180. One first tether 180 being as previously described anchored near the gas inlet passageway and extending toward the front face panel portion 103 of the airbag cushion 100 and the second tether 180 extending from the top of the central panel 102 towards the bottom of the central panel 102 of the airbag cushion similar to that of FIG. 9. The combination of two tethers 180 each having the "Y" shaped configuration are connected at two distinct slot openings 130 to form two spaced grooves or recesses, each formed by a groove panel portion 182 and a second groove panel 184 provide an added feature for controlling the airbag cushion deployment contact forces exerted onto an occupant.

Figure 11A:
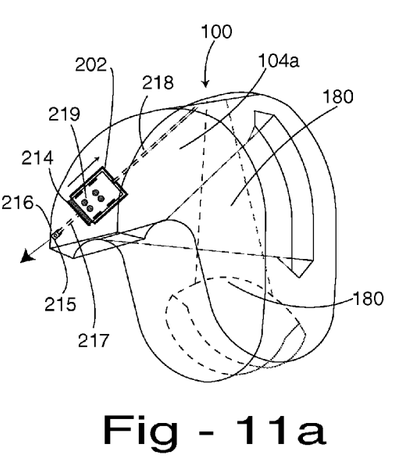
FIG. 11a illustrates the airbag cushion of the present invention with an optional vent mechanism.
Figure 11B:
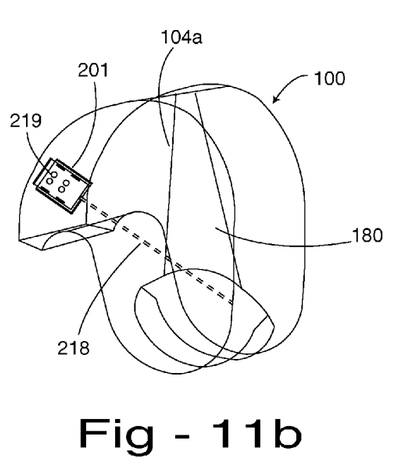
FIG. 11b illustrates the airbag cushion of the present invention shown with a second optional vent mechanism.

As shown in FIGS. 11a and 11b, the airbag cushion 100 can substitute the optional vent 119 shown in FIG. 3c with a vent mechanism 201 or 202. The vent mechanism 202 of FIG. 11a and 201 of FIG. 11b are shown affixed to a side panel 104a. The vent mechanism 201 shown in FIG. 11b may be passive or adaptive controlled by a vent tether 218 anchored to the airbag cushion 100 at one end to pull open or closed one or more vent openings 219. This vent mechanism 201 has a movable panel and is referred to as a passive or smart vent. The vent mechanism 202 of FIG. 11a may be activated by releasing a moveable pin 215 at the anchored end 216 of the vent tether 217 upon receiving a signal from a sensor (not illustrated) which can activate a solenoid or pyrotechnic device to move the pin 215. Alternatively, a releasable clamp can be used. This vent mechanism 202 is referred to as an active vent. The arrow shows the direction of pull the vent tether 217 has on the vent prior to being released. Once released, the vent tether 218 affixed to the airbag cushion pulls the vent flap 214 to open or close the vent 202 from an initial open or closed position. The use of a vent mechanism 201 or 202 in conjunction with the groove recess airbag cushion 100 of the present invention simply illustrates that such a combination is considered within the scope of the present invention.

In all other aspects the present invention achieves all the design performance benefits of grooved airbag cushions, but in a dramatically simplified and more cost efficient way.

Alternatively, the entire assembly of the two side panels and the center panel could be woven as a single piece. In any of these alternative constructions the use of a main tether panel 180 that forms part of the external surface of the airbag cushion 100 at a groove or recess is considered within the scope of this invention as claimed as follows.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An airbag cushion with a recessed portion formed on an exterior of the airbag cushion, the airbag cushion comprises:
   a pair of side panels;
   at least one tether for limiting outward movement of the inflated airbag cushion the at least one tether having a main tether portion attached to the airbag cushion at one end; and
   wherein an opposite end of the main tether portion of the at least one tether forms a portion of the exterior surface of the airbag cushion.

2. The airbag cushion of claim 1 wherein the tether has the main tether portion and a groove panel sewn to the main tether portion to form a branched tether.

3. The airbag cushion of claim 1 wherein the side panels have a curved outer periphery.

4. The airbag cushion of claim 3 wherein the tether has a main tether panel portion for limiting the outward movement of the cushion, the main tether panel portion has an outer groove forming portion, the groove forming portion being part of the exterior surface of the airbag cushion.

5. The airbag cushion of claim 4 wherein the tether has a groove panel sewn or otherwise attached to the main tether panel portion, the groove panel being similarly sized and shaped to the outer groove portion of the main tether panel portion and being part of the exterior surface of the airbag cushion, the tether having a "y" shape when viewed in a cross section.

6. The airbag cushion of claim 5 wherein the groove portion of the main tether panel portion and the groove panel are sewn along edges of the cut out in the central panel, the groove portion being sewn one edge of the cut out and the groove panel to an opposite edge of the cut out.

7. The airbag cushion of claim 6 wherein the main tether panel portion is sewn at an anchoring location inside the airbag cushion at or near the gas inlet passageway on a bottom or top portion of the central panel, where the main tether panel portion has a twist formed between the anchoring location at or near the inlet and the groove panel portions.

8. The airbag cushion of claim 7 wherein one end of the main tether panel portion is oriented in one direction, the opposite end is oriented in another direction with the main tether panel portion twisted.

9. The airbag cushion of claim 4 wherein the main tether panel portion has a generally truncated triangular shape, the widest part extending from the groove portion to a narrow terminal end, the distance between the narrow terminal end to the widest part limits the distance the airbag cushion can open.

10. The airbag cushion of claim 9 wherein the location wherein the groove panel is sewn or otherwise attached to the main tether panel portion of the tether defines the maximum depth of the recess formed in the airbag cushion.

11. The airbag cushion of claim 1 wherein the recessed portion is vertically oriented when the airbag cushion is deployed and inflated.

12. The airbag cushion of claim 1 comprises two tethers, each tether forming a portion of the exterior surface of the airbag cushion.

13. The airbag cushion of claim 12 wherein the at least one tether forming a portion of the exterior surface of airbag cushion is sewn or otherwise affixed to a top or upper surface of a central panel and extends to a bottom surface of the central panel.

14. The airbag cushion of claim 1 further comprises a vent mechanism affixed to the airbag cushion.

15. An airbag cushion with a recessed portion formed on an exterior of the airbag cushion, the airbag cushion comprises:
   a pair of side panels;
   a central panel interposed between the pair of side panels and attached along edges of each side panel defining a single inflatable chamber with a gas inlet passageway, the central panel having a cut out;
   at least one tether for limiting outward movement of the inflated airbag cushion; and
   wherein the tether has one end of the tether attached to the central panel proximate the cut out and the opposite end of the tether secured to the central panel proximate the gas inlet passage; the pair of side panels, the central panel, and portions of the tether form the exterior surface of the airbag cushion.

16. An airbag cushion with a recessed portion formed on an exterior of the airbag cushion, the airbag cushion comprises:
   a pair of side panels;
   at least one tether for limiting outward movement of the inflated airbag cushion; and
   wherein the at least one tether forms a portion of the exterior surface of the airbag cushion and wherein the at least one tether forming a portion of the exterior surface of airbag cushion is sewn or otherwise affixed to a top or upper surface of a central panel and extends to a bottom surface of the central panel.

17. The airbag cushion of claim 16 with a recessed portion on an exterior surface of the airbag cushion, the airbag cushion further comprising:
   a main tether portion of the at least one tether forming a portion of the exterior surface of the airbag;
   a groove panel sewn to the main tether portion; the tether being formed in a branched shaped; and
   wherein the tether forms a portion of the exterior surface of the airbag cushion.

18. The tether of claim 17 wherein the tether forms the surface of recessed portion on the exterior of the airbag cushion.

\* \* \* \* \*